US012613975B1

(12) United States Patent

Patel et al.

(10) Patent No.: US 12,613,975 B1

(45) Date of Patent: Apr. 28, 2026

(54) DISCOVERY OF NOVEL VULNERABILITIES IN SOFTWARE PACKAGES ON VERSION CONTROL PLATFORMS

(71) Applicant: Trend Micro Incorporated, Tokyo (JP)

(72) Inventors: Deep Chandubhai Patel, Ottawa (CA);
Pawan Kinger, Austin, TX (US);
Ashish Verma, Ottawa (CA)

(73) Assignee: Trend Micro Incorporated, Tokyo (JP)

( * ) Notice: Subject to any disclaimer, the term of this patent is extended or adjusted under 35 U.S.C. 154(b) by 105 days.

(21) Appl. No.: 18/619,909

(22) Filed: Mar. 28, 2024

(51) Int. Cl.
*G06F 21/00* (2013.01)
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 2018/0129812 A1* | 5/2018 | Kang | G06F 21/566 |
| 2022/0083667 A1* | 3/2022 | Anwar | G06F 8/75 |
| 2022/0198003 A1* | 6/2022 | Shaver | G06F 21/577 |
| 2024/0411666 A1* | 12/2024 | Chan | G06F 21/577 |
| 2025/0265350 A1* | 8/2025 | Madiraju | G06F 21/577 |

OTHER PUBLICATIONS

Danielle Gonzalez, Thomas Zimmermann, Patrice Godefroid, Max Schafer, "Anomalicious: Automated Detection of Anomalous and Potentially Malicious Commits on GitHub", https://patricegodefroid.github.io/public_psfiles/icse2021.pdf, Downloaded Dec. 29, 2023.
"Access Control", Wikipedia, https://simple.wikipedia.org/wiki/Access_control, Downloaded Dec. 29, 2023.
"Access Permissions on GitHub", GitHub Docs, https://docs.github.com/en/get-started/learning-about-github/access-permissions-on-github, Downloaded Dec. 29, 2023.
Thamindu Dilshan Jayawickrama, "Community Detection Algorithms", Medium, https://towardsdatascience.com/community-detection-algorithms-9bd8951e7dae, Jan. 29, 2021.
Shyam Sundar Meena, "Community Detection Using Louvain", Medium, https://medium.com/@ssmeena7/community-detection-using-louvain-61b460fd80b3#:~:text=4, May 18, 2023.

(Continued)

*Primary Examiner* — Ghazal B Shehni

(74) *Attorney, Agent, or Firm* — Beyer Law Group LLP

(57) ABSTRACT

Novel vulnerabilities in Open-Source Software (OSS) packages are identified from comments made on repositories of a version control platform. Security-related comments are identified and converted into a conversation format, such as a dialog. A prompt that includes the dialog is created and input to a generative Artificial Intelligence (AI) model. The prompt includes instructions that guide the AI model in generating an output. The output indicates whether a component of an OSS package has a vulnerability.

16 Claims, 7 Drawing Sheets

(56)        References Cited

OTHER PUBLICATIONS

"Community Structure", Wikipedia, https://en.wikipedia.org/wiki/
Community_structure, Downloaded Nov. 16, 2023.
"Louvain Method", Wikipedia, https://en.wikipedia.org/wiki/Louvain_
method, Downloaded Nov. 16, 2023.
"Modularity (Networks)", Wikipedia, https://en.wikipedia.org/wiki/
Modularity_(networks), Downloaded Dec. 14, 2023.
"Reviewing the Audit Log for Your Organization", GitHub Docs,
https://docs.github.com/en/enterprise-cloud@latest/organizations/
keeping-your-organization-secure/managing-security-settings-for-
your-organization/reviewing-the-audit-log-for-your-organization, Down-
loaded Nov. 16, 2023.
V. A. Traag, L. Waltman, N.J. van Eck, "From Louvain to Leiden:
Guaranteeing Well-Connected Communities", Scientific Reports,
https://www.nature.com/articles/s41598-019-41695-z, Published Mar.
26, 2019.

* cited by examiner

410 — *You are a security analysis assistant tasked with reviewing GitHub issue or pull request comments for potential security vulnerabilities, fixes, or advisory discussions. You will be provided with comments from such discussions and your role is to determine if there are any security-related concerns. Respond with "Yes" or "No," followed by a brief reason for your response.*

*Instructions: Carefully review each comment and assess if there are any security vulnerabilities or advisory discussions. Provide your analysis in the format "Yes, there is a security vulnerability discussed in Comment X due to [brief reason]." If no security concerns are present, respond with "No, there are no security vulnerabilities in this conversation."*

*Tone: Analytical and focused on security assessment.*

Issue Title: "Heap use-after-free still exists in the bit_copy_chain"
Issue Body: "# Vulnerability description\r\nversion: [0.12.4.4608](https://github.com/LibreDWG/libredwg/releases/tag/0.12.4.4608) & latest commit [f2dea29](https://github.com/LibreDWG/libredwg/commit/f2dea296a0a3bb16afdae8d2ca16749a617a4383)\r\npoc: [poc](https://github.com/0xdd96/PoC/raw/main/libredwg/UAF-bit_copy_chain)\r\ncommand: ./dwgrewrite poc\r\n\r\n_This is similar to issue #364 and others, but it seems that the patch https://github.com/LibreDWG/libredwg/commit/e95cc1eea8744c40e298208679eda14039b9b5d3 has not fully fixed them._\r\n\r\nHere is the trace reported by ASAN:\r\n```\r\n==28024==ERROR: AddressSanitizer: heap-use-after-free on address 0x7ffff3b65800 at pc 0x5555564f67f6 bp 0x7fffffff6760 sp 0x7fffffff6750\r\nREAD of size 1 at 0x7ffff3b65800 thread T0\r\n    #0 0x5555564f67f5 in bit_read_RC libredwg/src/bits.c:317\r\n    #1 0x5555564f67f5 in bit_copy_chain libredwg/src/bits.c:3352\r\n    #2 0x555556105ec6 in obj_flush_hdlstream libredwg/src/encode.c:833\r\n    #3 0x555556105ec6 in dwg_encode_PLANESURFACE_private libredwg/src/dwg.spec:9150\r\n    #4 0x5555563a57df in dwg_encode_PLANESURFACE libredwg/src/dwg.spec:9136\r\n    #5 0x5555563a57df in dwg_encode_variable_type libredwg/src/classes.inc:247\r\n    #6 0x5555563ab3d0 in dwg_encode_add_object libredwg/src/encode.c:4432\r\n    #7 0x5555563c914c in dwg_encode libredwg/src/encode.c:2769\r\n    #8 0x55555575ca00 in dwg_write_file libredwg/src/dwg.c:429\r\n    #9 0x555555758a3f in main libredwg/programs/dwgrewrite.c:350\r\n    #10 0x7ffff726f0b2 in __libc_start_main (/lib/x86_64-linux-gnu/libc.so.6+0x240b2)\r\n    #11 0x55555575924d in _start (libredwg/build-ASAN/dwgrewrite+0x20524d)\r\n\r\n\r\n0x7ffff3b65800 is located 0 bytes inside of 208896-byte region [0x7ffff3b65800,0x7ffff3b98800)\r\nfreed by thread T0 here:\r\n    #0 0x7ffff7699ffe in __interceptor_realloc (/lib/x86_64-linux-gnu/libasan.so.5+0x10dffe)\r\n    #1 0x5555564f532c in bit_chain_alloc_size libredwg/src/bits.c:3046\r\n    #2 0x5555564f532c in bit_chain_alloc libredwg/src/bits.c:3062\r\n    #3 0x5555564f532c in bit_copy_chain libredwg/src/bits.c:3339\r\n    #4 0x1900000105 (<unknown module>)\r\n\r\npreviously allocated by thread T0 here:\r\n    #0 0x7ffff7699ffe in __interceptor_realloc (/lib/x86_64-linux-gnu/libasan.so.5+0x10dffe)\r\n    #1 0x5555564f396f in bit_chain_alloc_size libredwg/src/bits.c:3046\r\n    #2 0x5555564f396f in bit_chain_alloc libredwg/src/bits.c:3062\r\n    #3 0x31fff (<unknown module>)\r\n```\r\n# Vulnerability analysis\r\n\r\nWhen running to `bit_copy_chain`, both `dat->chain` and `tmp_dat->chain` point to `0x7ffff3b65800` (see the gdb output below). \r\n\r\nThis will lead to use-after-free, since line 3339 calls `realloc`, which frees the chunk `0x7ffff3b65800`, and line 3352 ties to read from the freed chunk. \r\n\r\nAlso note that the comment says `bit_copy_chain` *Copy the whole content of tmp_data to dat, and reset tmp_dat*, so why `dat->chain = tmp_dat->chain` in this PoC should be further investigated.\r\n\r\nhttps://github.com/LibreDWG/libredwg/blob/f2dea296a0a3bb16afdae8d2ca16749a617a4383/src/bits.c#L3333-L3360\r\n\r\n```\r\npwndbg> p *dat\r\n$6 = {\r\n  chain = 0x7ffff3b65800,\r\n  size = 208896,\r\n  byte = 204890,\r\n  bit = 6 '\\006',\r\n  opts = 1 '\\001',\r\n  version = R_2000,\r\n  from_version = R_2004,\r\n  fh = 0x0\r\n}\r\n\r\npwndbg> p *tmp_dat\r\n$10 = {\r\n  chain = 0x7ffff3b65800,\r\n  size = 208896,\r\n  byte = 204882,\r\n  bit = 6 '\\006',\r\n  opts = 1 '\\001',\r\n  version = R_2000,\r\n  from_version = R_2004,\r\n  fh = 0x0\r\n}\r\n```\r\n"

FIG. 5

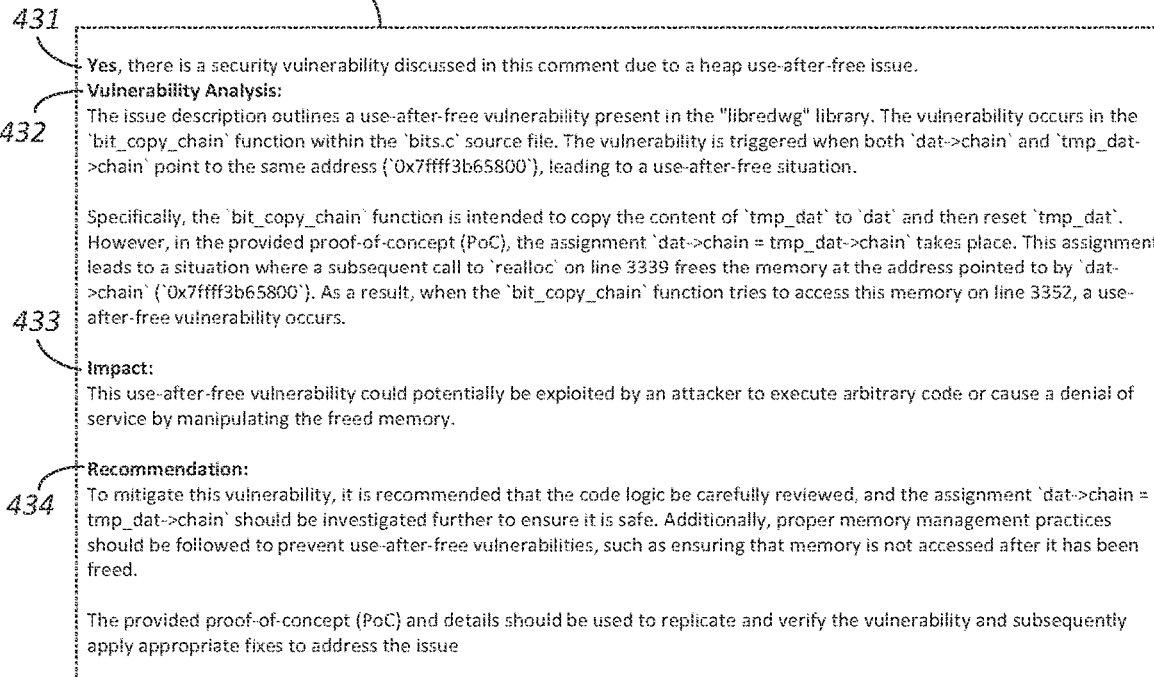

*431*

*430*

*432*

*433*

*434*

Yes, there is a security vulnerability discussed in this comment due to a heap use-after-free issue.

Vulnerability Analysis:
The issue description outlines a use-after-free vulnerability present in the "libredwg" library. The vulnerability occurs in the `bit_copy_chain` function within the `bits.c` source file. The vulnerability is triggered when both `dat->chain` and `tmp_dat->chain` point to the same address (`0x7ffff3b65800`), leading to a use-after-free situation.

Specifically, the `bit_copy_chain` function is intended to copy the content of `tmp_dat` to `dat` and then reset `tmp_dat`. However, in the provided proof-of-concept (PoC), the assignment `dat->chain = tmp_dat->chain` takes place. This assignment leads to a situation where a subsequent call to `realloc` on line 3339 frees the memory at the address pointed to by `dat->chain` (`0x7ffff3b65800`). As a result, when the `bit_copy_chain` function tries to access this memory on line 3352, a use-after-free vulnerability occurs.

Impact:
This use-after-free vulnerability could potentially be exploited by an attacker to execute arbitrary code or cause a denial of service by manipulating the freed memory.

Recommendation:
To mitigate this vulnerability, it is recommended that the code logic be carefully reviewed, and the assignment `dat->chain = tmp_dat->chain` should be investigated further to ensure it is safe. Additionally, proper memory management practices should be followed to prevent use-after-free vulnerabilities, such as ensuring that memory is not accessed after it has been freed.

The provided proof-of-concept (PoC) and details should be used to replicate and verify the vulnerability and subsequently apply appropriate fixes to address the issue

PROCESSOR    USER INPUT    DATA    DISPLAY
             DEVICES    STORAGE

*603*

*605*        *608*

NETWORK    MAIN MEMORY
INTERFACE
             *609*    SOFTWARE MODULES

*607*

COMPUTER
NETWORK

DISCOVERY OF NOVEL VULNERABILITIES IN SOFTWARE PACKAGES ON VERSION CONTROL PLATFORMS

TECHNICAL FIELD

The present disclosure is directed to cybersecurity.

BACKGROUND

Version control platforms allow software engineers to collaborate on software development projects. Examples of version control platforms include the GitHub platform, and platforms that run the Apache Subversion version control system and the Mercurial source control management tool. A software development project has a corresponding repository on the version control platform, with the repository comprising storage space that contains the files and other data of the software development project.

A vulnerability is a weakness or flaw in software that can be exploited by a threat actor, such as a hacker. Information on known vulnerabilities is tracked and cataloged by the National Institute of Standards and Technology (NIST), the MITRE corporation, cybersecurity vendors (e.g., Trend Micro Incorporated), the GitHub platform, and other organizations engaged in cybersecurity. Vulnerability information is used to remediate or mitigate vulnerabilities by patching, virtual patching, replacing the vulnerable software, etc.

Open-Source Software (OSS) packages are collections of software components (e.g., program code and libraries) that are made available for public use and modification. OSS packages are developed by a community of volunteers and software development organizations. Given the widespread use of OSS packages, vulnerabilities in components of OSS packages can have far-reaching effects. Developers should therefore remain alert, and keep OSS packages up to date with the latest, more secure versions, and stay informed about security alerts from the open-source community. However, OSS packages present challenges that are not present in closed (i.e., proprietary) software packages.

The tracking and cataloging of vulnerabilities in OSS packages can be especially challenging for several reasons. Firstly, the decentralized and diverse nature of the open-source community means that not all vulnerabilities may be reported or documented in a centralized database. Some smaller or less-known projects might not have dedicated resources for vulnerability tracking. Secondly, the sheer volume of OSS packages makes it difficult to maintain a comprehensive catalog of vulnerabilities. New packages are created regularly, and maintaining an up-to-date database for all of them is a resource-intensive task. Lastly, not all open-source projects have a structured disclosure process for vulnerabilities, making it impossible to track and address issues. The lack of formal reporting can lead to underreporting or delayed awareness of vulnerabilities.

To improve tracking and cataloging, efforts are ongoing to establish common vulnerability databases and to encourage more standardized disclosure practices within the open-source community. However, it remains a complex challenge due to the diverse and dynamic nature of open-source software development.

BRIEF SUMMARY

In one embodiment, a method of discovering novel vulnerabilities in Open-Source Software (OSS) packages on a version control platform includes receiving a plurality of comments on pull requests and commits from the version control platform. Security-related comments are identified from among the plurality of comments, the security-related comments are made on a repository of an OSS package. The security-related comments are converted to a conversation format to create a dialog. A prompt that includes the dialog is created and input to a generative artificial intelligence (AI) model. An alert is raised in response to an output from the AI model indicating that the security-related comments indicate a vulnerability in the OSS package.

In another embodiment, a system comprises a version control platform and a backend system. The backend system is configured to receive comments made on a pull request or a commit on a repository of the version control platform, the repository storing components of an OSS package; determine that the comments are security-related; convert the comments to a dialog; generate a prompt that includes the dialog; input the prompt to an AI model to receive an output from the AI model; and raise an alert in response to the output from the AI model indicating a vulnerability in the OSS package.

In yet another embodiment, a method of discovering novel vulnerabilities in OSS packages on a version control platform includes receiving a comment thread of a pull request or a commit from the version control platform, the comment thread including a plurality of comments on a repository of an OSS package. Security-related comments are identified from among the plurality of comments. The security-related comments are converted to a dialog. A prompt that includes the dialog and an instruction to a generative artificial intelligence (AI) model to output a binary response is created. The prompt is input to the AI model. An output that includes the binary response is received from the AI model. An alert is raised responsive to the binary response from the AI model indicating a vulnerability in the OSS package.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 shows an example system message that is included in a prompt, in accordance with an embodiment of the present invention.

FIG. 5 shows a comments example that is included in a prompt, in accordance with an embodiment of the present invention.

FIG. 6 shows an example output that is included in a prompt, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
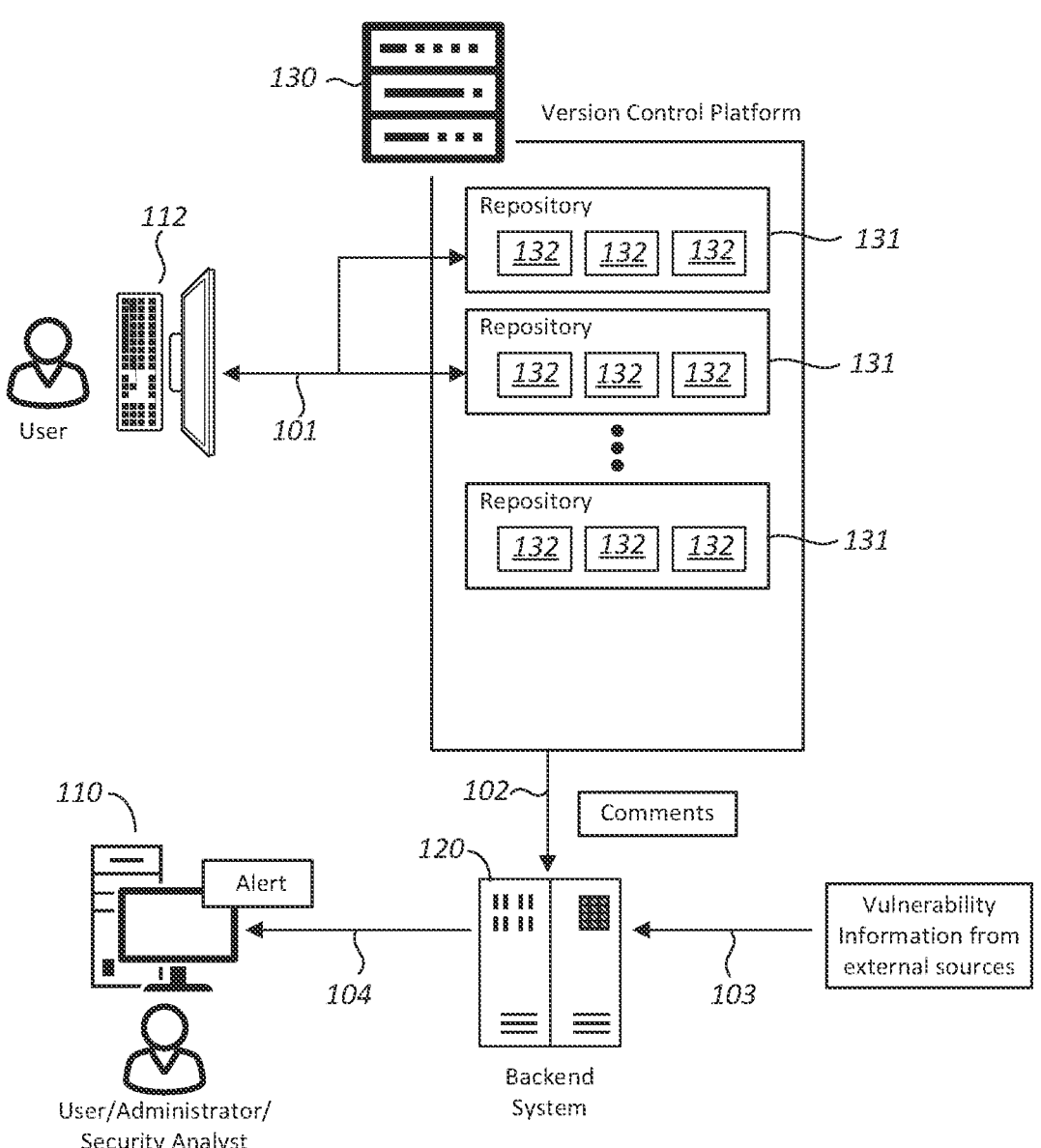
FIG. 1 shows a block diagram of a system for discovering novel vulnerabilities in OSS packages on version control platforms, in accordance with an embodiment of the present invention.

FIG. 1 shows a block diagram of a system for discovering novel vulnerabilities in OSS packages on version control platforms, in accordance with an embodiment of the present invention.

In the example of FIG. 1, the system includes a version control platform 130 and a backend system 120. The version control platform 130 includes a plurality of repositories 131, with each repository 131 providing storage space for files 132 and other data of a software development project. The repositories 131 may be implemented on network attached storage, cloud storage, or other storage system of or accessible to the version control platform 130. The version control platform 130 may be accessed over the public Internet. In one embodiment, the version control platform 130 is the GitHub platform and the repositories 131 are repositories of OSS packages (i.e., containing components of OSS packages).

Developers that employ the version control platform 130 are referred to as "users". A user employs a computer 112 to access one or more repositories 131 (see arrow 101). The version control platform 130 can accommodate a plurality of users, but only one is shown for clarity of illustration. The version control platform 130 allows users to make a commit to make a discrete change to a file 132; make a pull request to merge one or more commits into a different branch; retrieve a file 132; comment on issues, pull requests, and commits; and perform other user actions permitted by the particular version control platform 130. It is to be noted that although comments on a repository are part of the repository for review and collaboration purposes, the comments do not become part of the codebase, i.e., the comments are not entered in the source code.

The backend system 120 is a computer system that is configured to discover novel vulnerabilities in OSS packages based on comments on repositories of the version control platform 130. For purposes of the present disclosure, "novel" refers to a vulnerability that has not been publicly cataloged or published. By analyzing comments on repositories, embodiments of the present invention are capable of discovering novel vulnerabilities in OSS packages even those still in development. Discovering novel vulnerabilities in OSS packages is especially important in that it prevents zero-day attacks on a large number of released software that depends on the OSS packages.

In one embodiment, the backend system 120 is external to the version control platform 130. The backend system 120 may be implemented on a cloud computing platform (e.g., the Amazon Web Services (AWS)™ platform) or on a dedicated server computer system, for example. As can be appreciated, the functionality of the backend system 120 as described herein may also be incorporated into the version control platform 130. The backend system 120 includes at least one processor and a memory, with the memory storing instructions that when executed by the at least one processor of the backend system 120 cause the backend system 120 to operate as described herein.

The backend system 120 receives repository comments, i.e., comments made by users on issues, pull requests, and/or commits on repositories of OSS packages, from the version control platform 130 over the public Internet (see arrow 102). It is to be noted that unlike repositories of closed software packages, repositories and source code of OSS packages are publicly accessible. It is to be further noted that given the millions of issues, commits, and pull requests on the version control platform 130, the operations of the backend system 120 described herein cannot be practically performed manually. Furthermore, discovering vulnerability is time-critical and needs to be efficient, and thus necessarily requires computing resources to prevent zero-day attacks.

To discover novel vulnerabilities in real-time, the backend system 120 continuously receives and processes repository comments as they become available. This real-time feature is especially advantageous, but heretofore not adequately addressed in the cybersecurity field, because OSS packages are widely used in different systems. The backend system 120 may receive the repository comments using an application programming interface (API) of the version control platform 130, for example.

The backend system 120 may also receive vulnerability information from external sources (see arrow 103). As will be more apparent below, vulnerability information from external sources may be used to create a training dataset for fine tuning a generic Large Language Model (LLM) into a generative artificial intelligence (AI) model that is tailored to discover novel vulnerabilities.

The backend system 120 is configured to identify security-related comments from among the received repository comments. Security-related comments are comments that impact the security posture of a software package, which in this example are OSS packages. Comments that are not security-related, also referred to herein as "normal comments", are ignored. Normal comments are part of general software development discussion, and are not particularly helpful in discovering novel vulnerabilities. The backend system 120 converts security-related comments into a dialog, and creates a prompt that includes the dialog and other content that guide the AI model to generate an output. In one embodiment, the output from the AI model includes an indication as to whether or not the comments in the dialog indicate a vulnerability in the associated OSS package and a recommendation on how to mitigate the vulnerability.

In one embodiment, the backend system 120 raises an alert in response to discovering a vulnerability. The alert may include making an entry in a security log or in an audit log of the affected repository, sending a text or email message to a user, administrator, or security analyst; publicly cataloging or publishing the vulnerability; displaying a notification message on a display screen; and/or other form of notification. In the example of FIG. 1, an alert responsive to discovering a vulnerability in an OSS package is a message from the backend system 120, which is displayed on a display screen of a computer 110 (see arrow 104).

Figure 2:
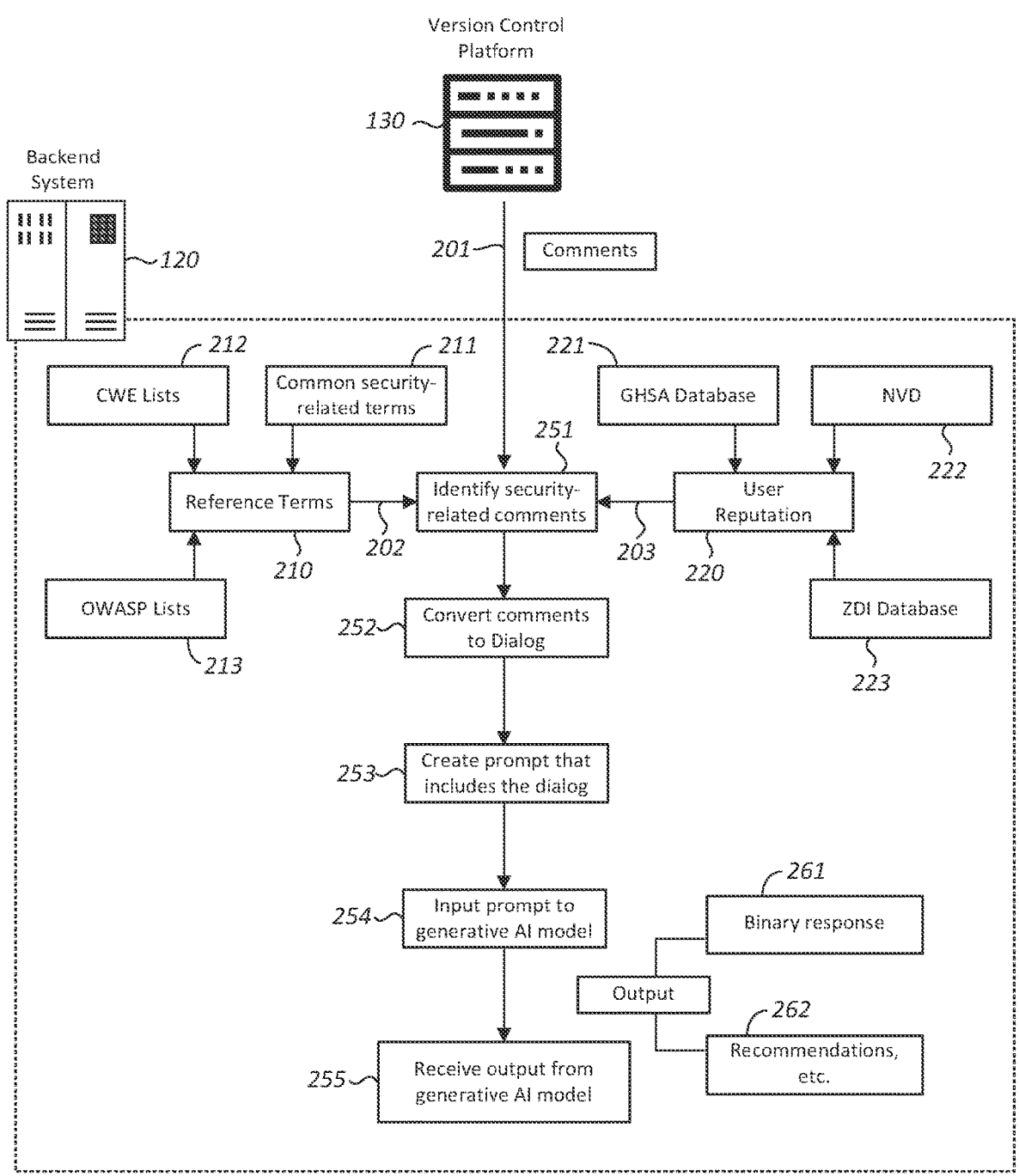
FIG. 2 shows a flow diagram of a method of discovering novel vulnerabilities in OSS packages on version control platforms, in accordance with an embodiment of the present invention.

FIG. 2 shows a flow diagram of a method of discovering novel vulnerabilities in OSS packages, in accordance with an embodiment of the present invention. In the example of FIG. 2, the steps of discovering novel vulnerabilities are all performed on the backend system 120 for illustration purposes only. As can be appreciated, the steps of methods disclosed herein may be performed on a single computer system or distributed across two or more computer systems.

In the example of FIG. 2, the backend system 120 continuously receives raw comments on issues, pull requests, and/or commits of repositories of OSS packages of the version control platform 130 (see arrow 201). Raw comments are in the format designated by the version control platform 130. In one embodiment, vulnerability discovery is performed per comment thread, i.e., a series of related comments on a particular issue, pull request, or commit. The comment thread may include a link to affected components of an OSS package. The backend system 120 may receive comments by way of a link to the corresponding comment thread.

The backend system 120 identifies security-related comments from among the received comments (step 251). Security-related comments may be identified by scanning the comments for reference terms (FIG. 2, 210) that are indicative of vulnerabilities (see arrow 202). The reference terms may include terms that are in the Common Weakness Enumeration (CWE) list (FIG. 2, 212), in the Open Web Application Security Project (OWASP) Top 10 list (FIG. 2, 213), and in other vulnerability information repositories. The reference terms also include those that are commonly-used in the cybersecurity field to discuss vulnerabilities, attack techniques, cyber threats, etc. These commonly-used terms may be found in cybersecurity reports in media, news, research papers etc. The reference terms may be identified and extracted automatically using a script or manually by security analysts. The reference terms may be stored in a database for case of access.

Example reference terms include: Out-of-bound Read, Injection, Broken Authentication, Sensitive, Data Exposure, XML External Entities, XXE, Access Control, Security Misconfiguration, Cross-Site Scripting, XSS, Insecure, Deserialization, Overflow, Heap, Buffer, Memory, Command, SQL, CSRF, Cross-Site, Request Forgery, Server-side, SSRF, etc.

Security-related comments may also be identified based on the reputation of the user that made the comment (see arrow 203). Comments from users who have a history of contributing to and providing vulnerability information are likely to be security-related. Such reputable users are assigned a good reputation, and may be found in the GitHub Security Advisories (GHSA) database (FIG. 2, 221), National Vulnerability Database (NVD) (FIG. 2, 222), and Zero Day Initiative (ZDI) database (FIG. 2, 223) as authors, contributors, etc. (e.g., under the credits section). Reputations of various users may be compiled by security analysts and stored in a repository for case of access by the backend system 120. The presence of reference terms and reputation of users in a comment thread may be considered by conventional means, e.g., by applying weights, to determine whether or not comments in a comment thread constitute a security-related discussion.

The identified security-related comments are converted by the backend system 120 to a more readable and understandable format, which in one embodiment is a conversation format, such as a dialog (step 252). The comments may be converted into a dialog using a script, for example. For purposes of the present disclosure, a dialog includes a transcript or other record of a conversation. The dialog is in contrast to raw comments, which may vary in appearance and format in a comment thread. The dialog allows the comments to be presented in a coherent, easy to understand, and consistent manner, thereby helping improve the accuracy of the AI model. As will be more apparent below, the AI model is fine tuned using training data that are in the same conversation format. In one embodiment, the AI model is created by fine tuning Azure OpenAI Service models.

The backend system 120 creates a prompt with instructions that include the dialog (step 253). The prompt is input to the AI model (step 254). Responsive to the prompt, the AI model generates an output that is received by the backend system 120 (step 255). The AI model is prompted to output a binary response (FIG. 2, 261), which in one embodiment is either "yes" or "no, with "yes" indicating that the comments in the dialog indicate a vulnerability in the associated OSS package and with "no" indicating that the comments in the dialog do not indicate a vulnerability in the associated OSS package. The AI model may also be prompted to provide recommendations, a brief explanation of its vulnerability analysis, and an impact of the vulnerability (FIG. 2, 262). As can be appreciated, the output of the AI model depends on the prompt and the training dataset used to fine tune the AI model.

Figure 3:
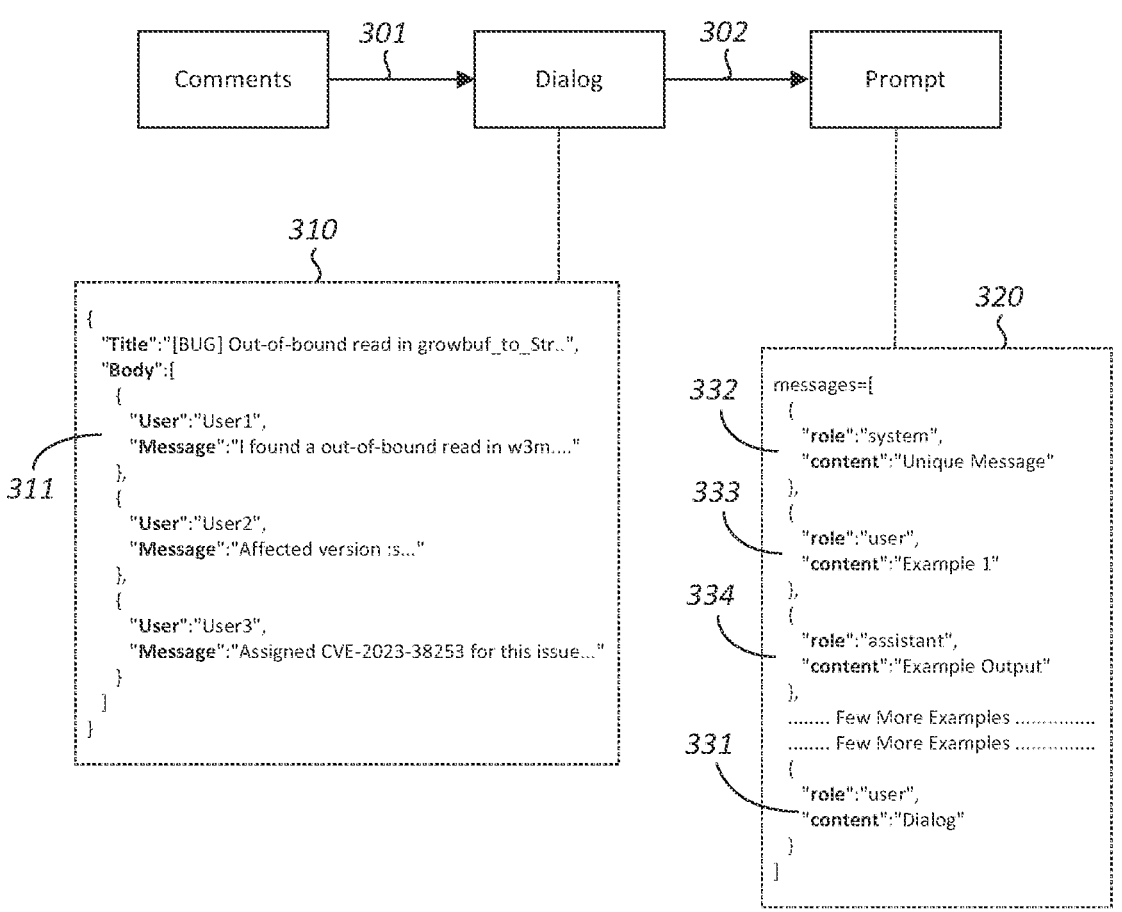
FIG. 3 illustrates the creation of prompts, in accordance with an embodiment of the present invention.

FIG. 3 illustrates the creation of prompts, in accordance with an embodiment of the present invention. In the example of FIG. 3, comments from a comment thread are converted to a dialog (see arrow 301), such as a dialog 310. The comments are detected to be security-related based on presence of reference terms (e.g., "Out-of-bound read") in the comments and the reputation of the user who made the comments ("User1"). The user and comments made by the user are reflected in the dialog 310 (FIG. 3, 311). In the example of FIG. 3, the dialog 310 has a title ("Title") taken from the comment thread and a body ("Body") where the comments are arranged in chronological or reply order. Each comment includes the content of the comment ("Message") and the user that made the comment ("User"). It is to be noted that a comment thread may have a single comment from one user, multiple comments from the same user, or have multiple comments from different users.

The dialog is incorporated into a prompt (see arrow 302), such as a prompt 320 that is subsequently passed to the AI model. In the example of FIG. 3, the prompt 320 is in a format compatible with the Azure OpenAI Service models, which accept contents for different roles, namely the system, user, and assistant. The Azure OpenAI Service models may be fine tuned to create a generative AI model for discovering novel vulnerabilities as described herein.

In the example of FIG. 3, the dialog 310 is included as content of a user role (FIG. 3, 331). The system message ("Unique Message") that instructs the AI model what it is being asked to do is included as content of a system role (FIG. 3, 332), example comments ("Example 1") that indicate a vulnerability are included as content of a user role (FIG. 3, 333), and example outputs ("Example Output") expected of the AI model are included as content of an assistant role (FIG. 3, 334). In general, providing a system message, example comments, and example outputs as part of a prompt improves the precision of the output format and response of the AI model. The prompt 320 is subsequently input to the AI model.

FIG. 4 shows an example system message 410, in accordance with an embodiment of the present invention. The system message 410 corresponds to "Unique Message" in the prompt 320 of FIG. 3 (FIG. 3, 332). In the example of FIG. 4, the system message 410 instructs the AI model of its task as a security analyst, instructs the AI model to provide a yes or no answer on whether the comments indicate a vulnerability, and instructs the AI model of the tone of the security assessment to be provided by the AI model.

FIG. 5 shows a comments example 420, in accordance with an embodiment of the present invention. The comments example 420 corresponds to "Example 1" in the prompt 320 of FIG. 3 (FIG. 3, 333). The comments example 420 provides the AI model an example of comments that indicate a vulnerability. The more examples of comments provided to the AI model, the better the accuracy of the AI model.

FIG. 6 shows an example output 430, in accordance with an embodiment of the present invention. The example output 430 corresponds to "Example Output" in the prompt 320 (FIG. 3, 334). The example output 430 provides the AI model an example output format and security assessment. It is to be noted that the example output 430 includes a yes or no answer (FIG. 6, 431), a vulnerability analysis (FIG. 6, 432), impact (FIG. 6, 433), and a recommendation (FIG. 6, 434). The example output 430 guides the AI model what is expected of it in terms of output. Again, the more examples provided to the AI model, the better the accuracy of the AI model. The prompt containing the example output 430 is input to the AI model, which in response generates an output in a format that is in accordance with the example output 430.

Figure 7:
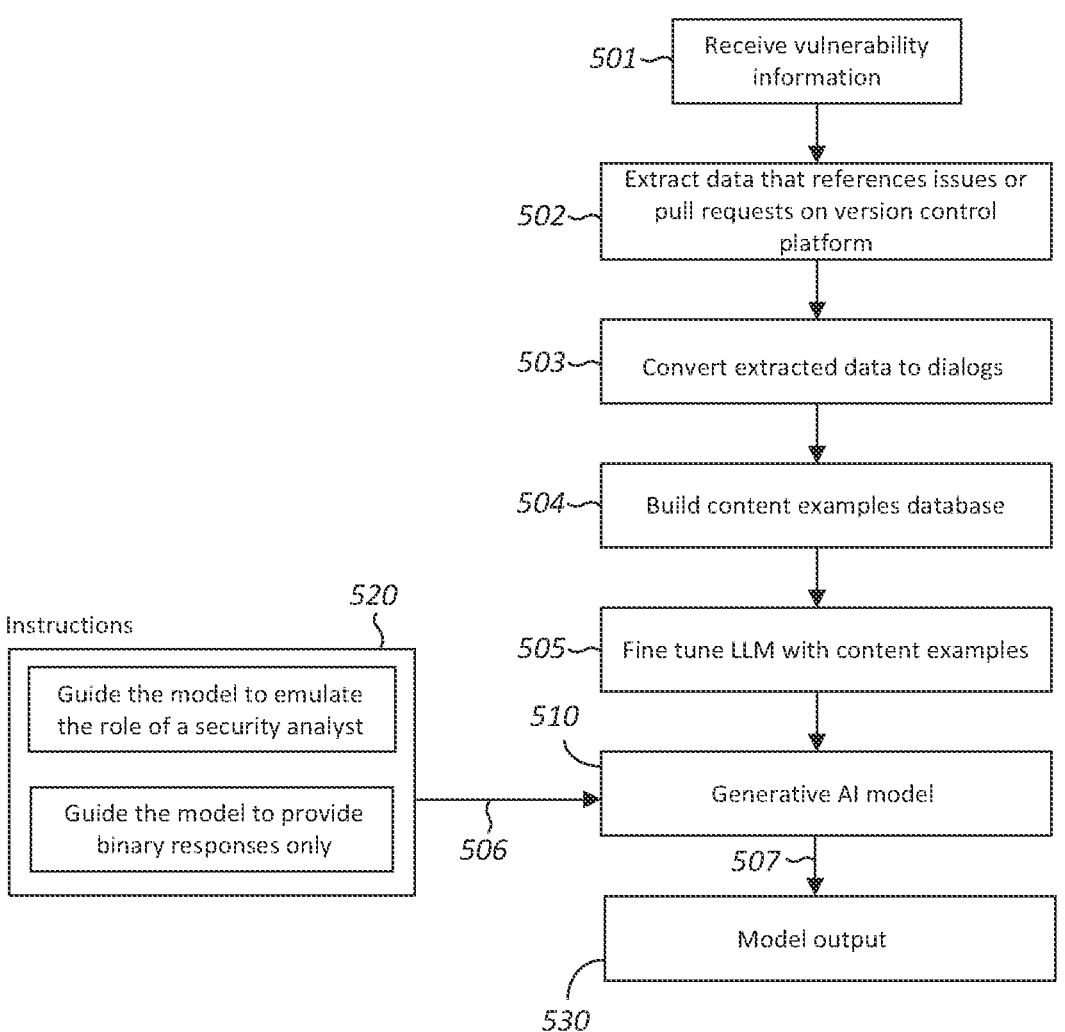
FIG. 7 shows a flow diagram of a method of using a generative AI model to discover novel vulnerabilities in OSS packages on version control platforms, in accordance with an embodiment of the present invention.

FIG. 7 shows a flow diagram of a method of using a generative AI model to discover novel vulnerabilities in OSS packages, in accordance with an embodiment of the present invention. The method of FIG. 7 may be performed on the backend system 120.

In the example of FIG. 7, vulnerability information is received from external vulnerability information sources (step 501). Data that reference issues or pull requests on a version control platform are extracted from the received vulnerability information (step 502). The extracted data are converted to dialogs (step 503). Each of the dialogs is used as a content example and stored in an examples database (step 504). The content examples are used as training dataset for fine tuning a generic LLM, such as the Azure OpenAI Service models, to generate a fine-tuned, generative AI model 510 (step 505).

The content examples serve as an educational tool, enabling a generic LLM to learn from real-world scenarios and gradually understand the dynamics of input-response. The content examples are selected to cover a broad spectrum of potential situations, thus preparing the LLM for diverse contingencies. In one embodiment, the content examples are obtained from the National Vulnerability Database (NVD), which is a rich source of real-world examples, thereby enhancing the LLM's learning experience. References to GitHub platform issues or pull requests are extracted from the NVD. These references are packed with valuable information about specific issues or pull requests, and serve as practical examples for the LLM. The references may contain mitigations, advisories, and other content that may be learned by the AI model to identify vulnerabilities from comments, determine impacts of vulnerabilities, and make recommendations to mitigate vulnerabilities. The references are transformed into dialogs as in the prompts, changing the conventional technical format of the GitHub platform issues and pull requests into a more coherent and consistent format. Converting the references to dialogs align the content examples to the format of the prompts to enhance the accuracy of the AI model 510 in discovering novel vulnerabilities.

During the application phase, a prompt containing a dialog of comments and instructions 520 is passed to the AI model 510 (see arrow 506), which outputs a model output 530 in response (see arrow 507). The instructions 520 guide the AI model 510 to emulate the role of a security analyst and to provide a binary response on the question of whether the comments indicate a vulnerability. The instructions 520 prevent the AI model 510 from functioning in a broad, generic fashion, and instead adhere strictly to the specificities of a security analyst's role. This targeted approach aids in garnering precise and context-specific responses from the AI model 510. The binary response, which is either "yes" or "no" in one embodiment, reduces ambiguity, making the AI model's 510 output more straightforward and comprehensible. Furthermore, it aids in swift decision-making, as the response is concise, clear, and devoid of subjective interpretation.

Figure 8:
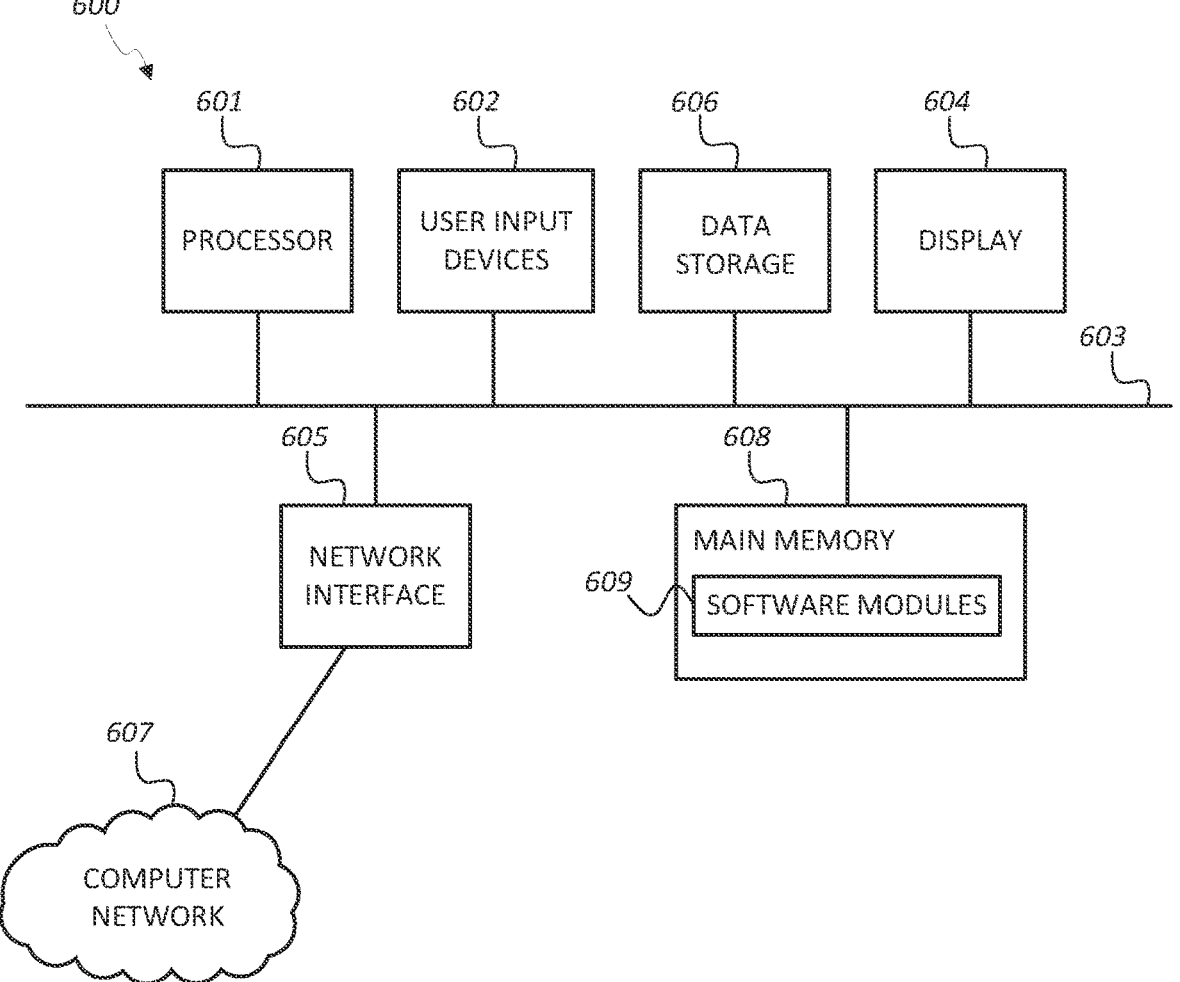
FIG. 8 shows a block diagram of a computer system that may be employed with embodiments of the present invention.

FIG. 8 shows a block diagram of a computer system 600 that may be employed with embodiments of the present invention. The computer system 600 may be employed as a backend system or other computer described herein. The computer system 600 may have fewer or more components to meet the needs of a particular cybersecurity application. The computer system 600 may include one or more processors 601. The computer system 600 may have one or more buses 603 coupling its various components. The computer system 600 may include one or more user input devices 602 (e.g., keyboard, mouse), one or more data storage devices 606 (e.g., hard drive, optical disk, solid state drive), a display screen 604 (e.g., liquid crystal display, flat panel monitor), a computer network interface 605 (e.g., network adapter, modem), and a main memory 608 (e.g., random access memory). The computer network interface 605 may be coupled to a computer network 607, which in this example includes the public Internet.

The computer system 600 is a particular machine as programmed with one or more software modules 609, comprising instructions stored non-transitory in the main memory 608 for execution by at least one processor 601 to cause the computer system 600 to perform corresponding programmed steps. An article of manufacture may be embodied as computer-readable storage medium including instructions that when executed by at least one processor 601 cause the computer system 600 to be operable to perform the functions of the one or more software modules 609.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of discovering novel vulnerabilities in Open-Source Software (OSS) packages on a version control platform, the method comprising:

receiving a plurality of comments on pull requests or commits from the version control platform, the plurality of comments being made on repositories of the OSS packages on the version control platform;

identifying security-related comments from among the plurality of comments, the security-related comments are made on a repository of an OSS package;

converting the security-related comments to a conversation format to create a dialog;

creating a prompt that includes the dialog;

inputting the prompt to a generative artificial intelligence (AI) model;

receiving, from the generative AI model, an output that is responsive to the prompt; and raising an alert in response to the output from the AI model indicating that the security-related comments indicate a vulnerability in the OSS package.

2. The method of claim 1, wherein the prompt instructs the generative AI model to provide a binary response as to whether the security-related comments in the dialog indicate a vulnerability.

3. The method of claim 2, wherein the binary response is either a "yes" or a "no", the "yes" response indicates that the OSS package has a vulnerability, and the "no" response indicates that the OSS package does not have a vulnerability.

4. The method of claim 1, wherein raising the alert includes publicly publishing or cataloging the vulnerability.

5. The method of claim 1, wherein the comments are arranged in chronological or reply order in the dialog.

6. The method of claim 1, wherein identifying the security-related comments includes identifying reference terms that are indicative of vulnerabilities in the security-related comments.

7. The method of claim 1, wherein identifying the security-related comments includes determining a reputation of one or more users who made the security-related comments.

8. A system comprising:

a version control platform having a plurality of repositories; and a backend system comprising at least one processor and a memory, the memory of the backend system storing instructions that when executed by the at least one processor of the backend system cause the backend system to:

receive comments on a pull request or a commit of a repository of the plurality of repositories of the version control platform, the repository storing components of an Open-Source Software (OSS) package;

determine that the comments are security-related;

convert the comments to a dialog;

generate a prompt that includes the dialog;

input the prompt to a generative artificial intelligence (AI) model to receive an output from the AI model; and raise an alert in response to the output from the generative AI model indicating a vulnerability in the OSS package.

9. The system of claim 8, wherein the instructions stored in the memory of the backend system, when executed by the at least one processor of the backend system, cause the backend system to raise the alert by sending a notification to another computer.

10. The system of claim 8, wherein the prompt includes an instruction to the generative AI model to provide a binary response as to whether the comments indicate a vulnerability.

11. The system of claim 10, wherein the binary response is either a "yes" or a "no", wherein the "yes" response indicates that the OSS package has a vulnerability and the "no" response indicates that the OSS package does not have a vulnerability.

12. A method of discovering novel vulnerabilities in Open-Source Software (OSS) packages on a version control platform, the method comprising:

receiving a comment thread of a pull request or a commit from the version control platform, the comment thread including a plurality of comments on a repository of an OSS package;

identifying security-related comments from among the plurality of comments;

converting the security-related comments to a dialog;

creating a prompt that includes the dialog and an instruction to a generative artificial intelligence (AI) model to output a binary response;

inputting the prompt to the generative AI model;

receiving, from the generative AI model, an output that includes the binary response; and raising an alert in response to the binary response from the generative AI model indicating a vulnerability in the OSS package.

13. The method of claim 12, wherein the binary response is either a "yes" or a "no", the "yes" response indicates that the OSS package has a vulnerability and the "no" response indicates that the OSS package does not have a vulnerability.

14. The method of claim 12, wherein identifying the security-related comments includes scanning the plurality of comments for reference terms that are indicative of vulnerabilities.

15. The method of claim 14, wherein identifying the security-related comments includes determining a reputation of one or more users that made the plurality of comments.

16. The method of claim 12, wherein raising the alert includes publicly cataloging or publishing the vulnerability.

\* \* \* \* \*